United States Patent [19]

Mine et al.

[11] Patent Number: 5,013,067
[45] Date of Patent: May 7, 1991

[54] METHOD AND APPARATUS FOR CONTROLLING VEHICLE HEIGHT

[75] Inventors: Atsushi Mine; Katsuyoshi Kamimura; Yutaka Hiwatashi, all of Tokyo, Japan

[73] Assignee: Fuji Jukogyo Kabushiki Kaisha, Tokyo, Japan

[21] Appl. No.: 464,389

[22] Filed: Jan. 12, 1990

[30] Foreign Application Priority Data

Jan. 19, 1989 [JP] Japan .................................. 1-10334

[51] Int. Cl.$^5$ ............................................. B60G 17/00
[52] U.S. Cl. ............................... 280/840; 280/DIG. 1; 280/707; 280/709; 307/10.1; 364/424.05
[58] Field of Search ....................... 280/707, 840, 6.12, 280/DIG. 1, 709; 307/10.1; 180/41; 364/424.05

[56] References Cited

U.S. PATENT DOCUMENTS

| | | | |
|---|---|---|---|
| 4,349,077 | 9/1982 | Sekiguchi | 280/6.12 |
| 4,787,644 | 11/1988 | Yokote et al. | 280/840 |
| 4,805,923 | 2/1989 | Soltis | 280/707 |
| 4,829,436 | 5/1989 | Kowalik et al. | 280/840 |
| 4,838,563 | 6/1989 | Konishi et al. | 280/840 |

FOREIGN PATENT DOCUMENTS 139709 6/1987 Japan .

*Primary Examiner*—Richard A. Bertsch
*Attorney, Agent, or Firm*—Beveridge, DeGrandi & Weilacher

[57] ABSTRACT

Vehicle height control for a motor vehicle which has height adjusting means for each of wheel suspensions and which is stationary on a distorted road surface. Height control is carried out for either one of the front wheel suspension pair and the rear wheel suspension pair to attain a reference vehicle height for both the left and right wheels of the one pair whereby the vehicle part having said one pair assumes an attitude parallel to the inclination of the road surface in a direction transverse to the vehicle part. For the other pair of the wheel suspensions, height control is carried out such that the opposite part of the vehicle with the other pair of the wheel suspension will assume an attitude substantially equivalent to the attitude of the first mentioned vehicle part, whereby a good balance is obtained between the contact loads of the wheels.

7 Claims, 6 Drawing Sheets

METHOD AND APPARATUS FOR CONTROLLING VEHICLE HEIGHT

BACKGROUND OF THE INVENTION

The present invention relates to a method of and an apparatus for controlling height of a vehicle having a vehicle height adjusting device.

Conventionally motor vehicles are known that have a vehicle height adjusting device to control the height of a vehicle to zones such as high, medium and low. Motor vehicles are also known that monitor the vehicle height at a high resolution (such as in millimeter units, for example) and that independently adjust the height for each of the four wheels. Such vehicles are disclosed in Japanese Patent Laid-Open No. 139709/1987, for example.

In general, when a vehicle is stationary on a distorted road surface, a state of equilibrium is attained with some suspensions being in an extended state and other suspensions being in a contracted state. However, in vehicles having a vehicle height adjusting device as described above, and, in particular, in those vehicles that perform vehicle height adjustment at a high resolution (such as vehicles having active suspension), the suspension attempts to achieve the objective of a reference vehicle height. In the case of general vehicles that do not have a vehicle height adjusting device, the distortion of road surfaces can be absorbed by extension and contraction of the suspensions. However, in the case of vehicles having a vehicle height adjusting device, the distortion of road surfaces can only be absorbed by elastic deformation of tires of the wheels as the distortion cannot be absorbed by the extension and contraction of the suspensions. Since the spring constant of the tires is normally about one tenth of the spring constant of the suspensions, the balance between the contact loads of the wheels deteriorates and in the worst instance, the vehicle height control either does not end regardless of how much time elapses, or there occurs a status where one wheel is in a state of non-contact with the road.

SUMMARY OF THE INVENTION

The object of the present invention is to solve these problems and to provide a method of and an apparatus for controlling the height of a vehicle having a vehicle height adjusting device, wherein a good balance is maintained between the contact loads of the wheels in various conditions of the vehicle.

According to the present invention, in one aspect thereof, there is provided a method of controlling height of a vehicle having vehicle height adjusting means, wherein strokes of suspensions of front and rear wheels are detected and the height of the vehicle is controlled responsive to the detected strokes so as to attain a reference vehicle height independently for each of the suspensions, said method comprising the steps of: detecting the strokes of the suspensions of the front wheels and the rear wheels when the vehicle speed becomes zero; controlling the vehicle height adjusting means with respect to one of the front wheel suspension pair and the rear wheel suspension pair to attain the reference vehicle height for both the left and right wheels of the one pair so that the vehicle assumes an attitude matching a transverse inclination of a road surface at an end part of the vehicle having said one pair of the suspensions; and controlling the vehicle height adjusting means with respect to the other pair of the suspensions to change the reference vehicle height responsive to the detected strokes such that an end part of the vehicle having said other pair of the suspensions assumes an attitude, with respect to a direction transverse to the vehicle, equal to said attitude of the end part of the vehicle having said one pair.

According to the present invention, in another aspect thereof, there is provided an apparatus for controlling height of a vehicle, having vehicle height adjusting means for each of front and rear wheels, detection means for detecting strokes of suspensions of the wheels, respectively, and a controller responsive to the detected strokes for controlling the height of the vehicle so as to attain a reference vehicle height independently for each of the suspensions, said apparatus comprising: first means for controlling the vehicle height with respect to one of the front wheel suspension pair and the rear wheel suspension pair to attain the reference vehicle height for both the left and right wheels of the one pair so that the vehicle assumes an attitude matching a transverse inclination of a road surface at the end part of the vehicle having said one pair of the suspensions; and second means responsive to the detected strokes for controlling the vehicle height adjusting means with respect to the other pair of the suspensions to change the reference vehicle height when the vehicle speed is zero, such that the end part of the vehicle having said other pair of the suspensions assumes an attitude, with respect to a direction transverse to the vehicle, equal to said attitude of the end part of the vehicle having said pair.

When a vehicle is stationary on a road surface having no distortion, the suspensions for the four wheels are controlled so that the vehicle height is changed to maintain the reference vehicle height. On the other hand, when the vehicle is stationary on a distorted road surface, a discrepancy in the differences of suspension strokes between the left and right front wheels and the left and right rear wheels occurs. Thereupon, either the front or the rear wheels are controlled so that the reference vehicle height is maintained, and either the front or rear end of the vehicle is in a state where it is practically parallel to the road surface. Meanwhile, the other wheels such as the left and right rear wheels perform vehicle height adjustment in accordance with the state of the front wheels in such a manner that imbalance between the contact loads of tires can be prevented along with the unwanted situation of one tire being in a noncontact state with the road.

A preferred embodiment of the present invention will become understood from the following detailed description referring to the accompanying drawings.

DESCRIPTION OF THE PREFERRED EMBODIMENT

Figure 1:
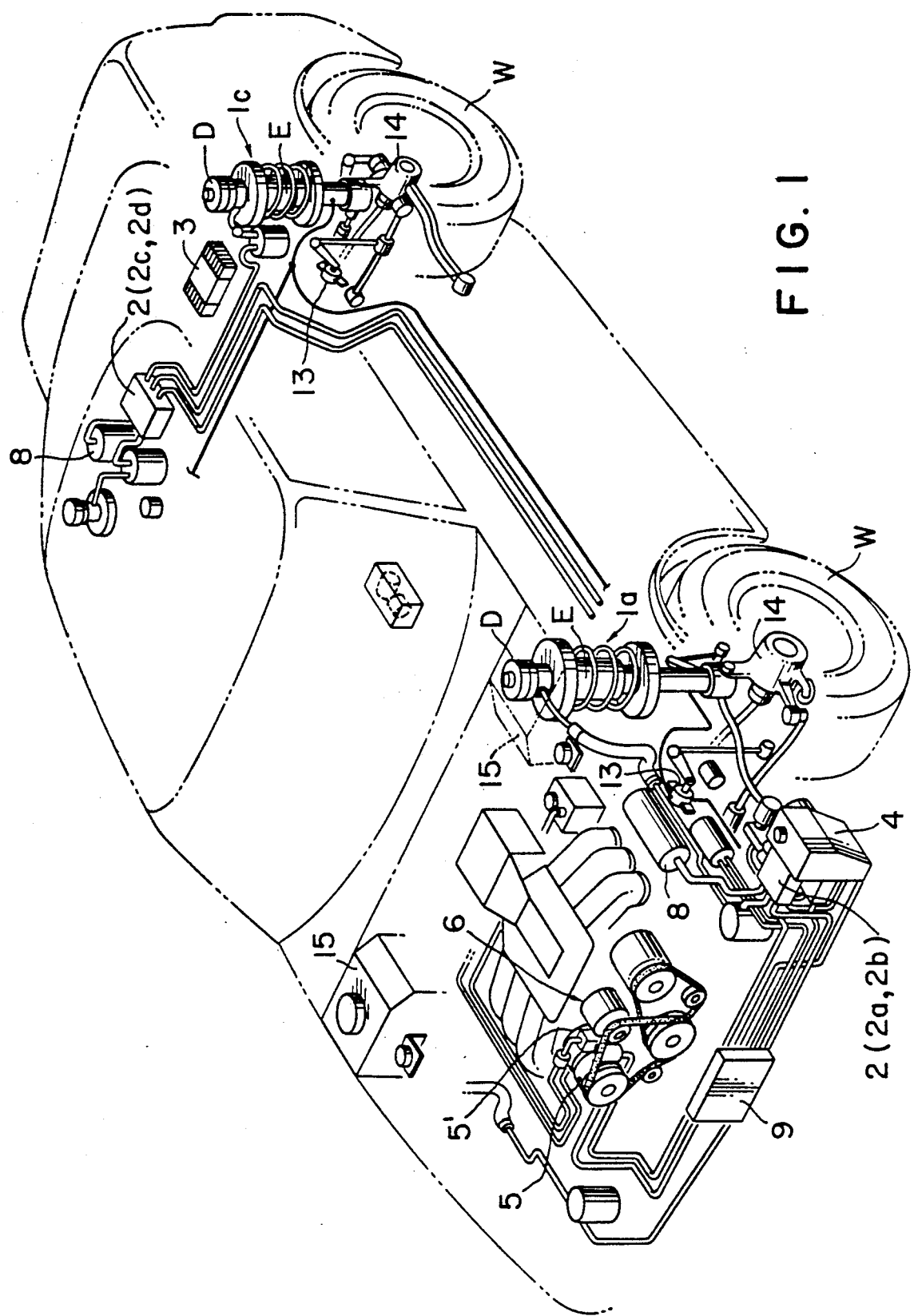
FIG. 1 is a schematic perspective view showing a vehicle suspension system for a vehicle having a vehicle height adjusting device, to which the present invention may be applied.
Figure 2:
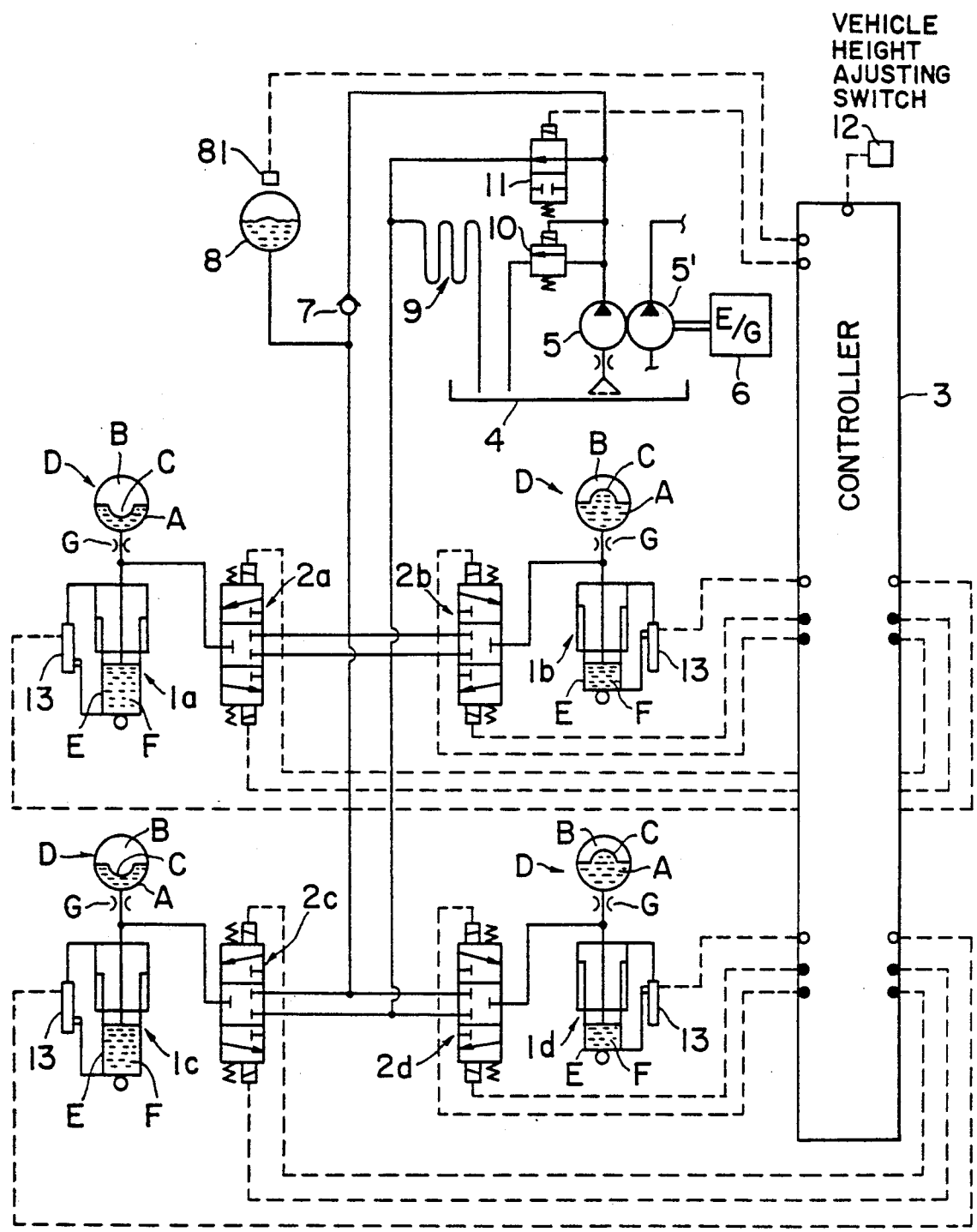
FIG. 2 is a hydraulic circuit diagram showing the vehicle height adjusting device of FIG. 1.

FIGS. 1 and 2 show an active suspension system to which the present invention may be applied. In FIG. 2, 1a and 1b indicate suspensions of the left and right front wheels of a motor vehicle, and 1c and 1d indicate suspensions of the left and right rear wheels. Each of the suspensions 1a, 1b, 1c and 1d is provided with a pneumatic spring portion D and a hydraulic cylinder E. The spring portion D has an oil chamber A and a fully-sealed air chamber B which are divided by a diaphragm C. The oil chamber A of the pneumatic spring portion D and an oil chamber F of the hydraulic cylinder E are communicated through an orifice G. As shown in FIG. 1, one end of the hydraulic cylinder E (such as a bottom portion of the cylinder) is connected to a member 14 (such as a suspension arm of the like) on the vehicle wheel W, and the other end (a piston rod) of the hydraulic cylinder E is connected to a member 15 of the vehicle chassis. In accordance with the loads in the up and down directions, hydraulic oil flows between the oil chamber F and the oil chamber A through the orifice G so as to generate an appropriate damping force and at the same time to produce a spring action by the volumetric elasticity of the air sealed in the air chamber B. The system described above constitutes a known hydropneumatic suspension system.

There are provided control valves 2a, 2b, 2c and 2d that supply and discharge oil to and from the oil chambers F of the corresponding hydraulic cylinders E. These control valves 2a, 2b, 2c and 2d are operated independently by valve drive signals from a controller 3 to be described later. In FIG. 1, the control valves 2a, 2b, 2c and 2d are installed separately in two groups for the front and rear suspensions.

An oil pump 5 is driven by an engine 6 to pump up oil in the oil reservoir 4. In the system shown, an oil pump 5' for power steering and the oil pump 5 described above are driven in tandem by the engine 6 so that they rotate together.

The oil discharged from the oil pump 5 passes through a check valve 7 and is stored in a high-pressure accumulator 8. In FIG. 1, the accumulator 8 is shown to be divided into two for the front and rear suspensions. When, either one, or two or more of the control valves 2a, 2b, 2c and 2d are switched to the intake side, high-pressure oil is supplied through the control valves that have been switched to the intake side, to the oil chamber F of either one, or two or more of the corresponding suspensions 1a, 1b, 1c and 1d. When either one or two or more of the control valves 2a, 2b, 2c and 2d are switched to the discharge side, oil is discharged from the oil chambers F of either one, or two or more of the corresponding suspensions 1a, 1b, 1c and 1d and the oil passes through an oil cooler 9 to flow into the oil reservoir 4.

In FIG. 2, numeral 10 indicates a relief valve and numeral 11 indicates a load/unload valve which is switched by the controller 3 to the unload state indicated in the figure, when a signal from a pressure sensor 81 indicates that the high-pressure accumulator 8 has attained a predetermined pressure. When the valve 11 is switched to the unload side, the oil discharged from the oil pump 5 flows to the oil cooler 9 and then into the oil reservoir 4.

The suspensions 1a, 1b, 1c and 1d are provided with suspension stroke sensors 13 as shown in FIGS. 1 and 2. The sensors 13 detect vertical relative displacements between the wheels and the vehicle body, respectively, and input information of the vertical relative displacements of the suspensions 1a, 1b, 1c and 1d to the controller 3.

Reference vehicle height signals from a vehicle height adjusting switch 12 is input to the controller 3 to selectively set the vehicle height. When the vehicle height adjusting switch 12 selectively sets the normal vehicle height as "low", for example, the controller 3 compares vertical relative displacement signals input from the suspension stroke sensors 13 with the normal reference vehicle height signal from the vehicle height adjusting switch 12, to generate valve drive signals to switch the control valves of suspensions which are contracted, to the intake side, and to switch the control valves of suspensions which are extended, to the discharge side, whereby control to maintain the normal reference vehicle height is independently performed for each of the suspensions 1a, 1b, 1c and 1d.

When the vehicle height adjusting switch 12 is switched to the "high" reference vehicle height, control is independently performed so that oil flows into and is discharged from each of the suspensions 1a, 1b, 1c and 1d so as to maintain the "high" reference vehicle height for all suspensions in a manner similar to that which has been described above.

The input signals from the suspension stroke sensors 13 pass through an insensitive band circuit provided in the controller 3 so that there is no response to minute displacements of less than a few millimeters, for example.

Figure 3:
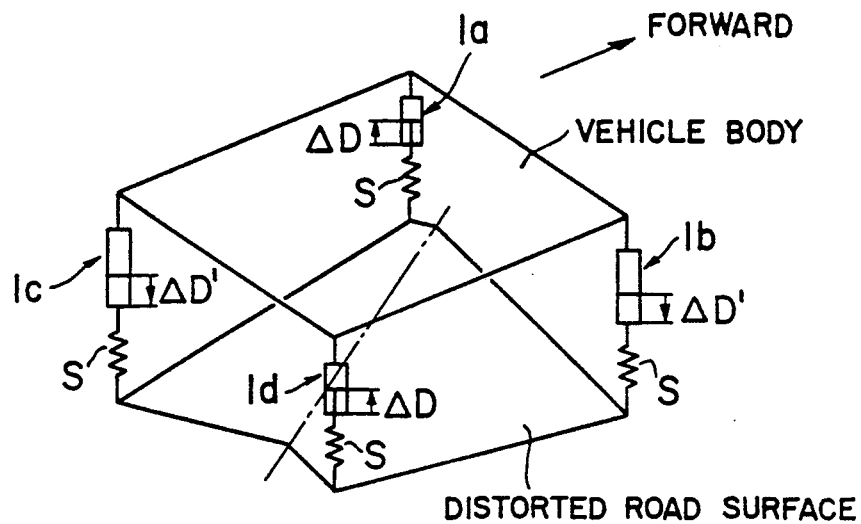
FIG. 3 is a diagrammatic perspective view for a model description of the states of extension and contraction of the suspensions when a vehicle is stationary on a distorted road surface.

As has been described above, when the vehicle is stationary on a distorted road surface such as indicated in the model diagram in FIG. 3, and when the vehicle is fitted with an active suspension that performs independent vehicle height control for each of the suspensions provided with suspension stroke sensors 13 that monitor the vehicle height to a high resolution in millimeter units, the suspensions 1a and 1d of the left front wheel and the right rear wheel are at relatively high positions on the road surface and contract from the reference vehicle height by $\Delta D$, and the suspensions 1b and 1c of the right front wheel and the left rear wheel are at relatively low positions on the road surface and extend from the reference vehicle height by $\Delta D'$. When this occurs, signals from the suspension stroke sensors 13 of the suspensions 1a, 1b, 1c and 1d are input to the controller 3, and control as has been described earlier is performed so that all of strokes of the suspensions are returned to the reference value corresponding to the reference vehicle height. Therefore, oil flows into the corresponding hydraulic cylinders to extend the suspensions 1a and 1d of the left front wheel and the right rear wheel which are on high portions of the road surface, while oil is discharged from the corresponding cylinders to contract the suspensions 1b and 1c of the right front wheel and the left rear wheel which are on low portions of the road surface, so that the length of each of the suspensions is made the same.

When this occurs, the road distortion can only be absorbed by the elasticity of the tires of the wheels (with spring S shown in FIG. 3 indicating the elasticity of the tires). However, the spring constant of the tires cannot fully absorb the road distortion since the spring constant is generally only one tenth of the spring constant of the suspensions. Therefore, a tire at a low portion of the road surface assumes a non-contact state with the road surface so that the balance deteriorates. This means that there occurs an undesirable situation where control to return each of the suspensions to the reference vehicle height does not end.

In the light of this problem, the present invention is devised so as to eliminate the above situation by the incorporation into the controller 3 of the control logic described below.

The suspension strokes $D'_{FL}$ and $D'_{FR}$ of the left and right front wheels and the suspension strokes $D'_{RL}$ and $D'_{RR}$ of the left and right rear wheels are read from the signals input from the suspension stroke sensors 13 at the time when the vehicle speed has become zero. In this case, either the suspensions of the front wheels or the rear wheels, say, the front wheels are subjected to normal control wherein oil intake and discharge are performed so that the respective reference vehicle heights $D_{FLO}$ and $D_{FRO}$ are attained.

As for the rear-wheel suspensions 1c and 1d, the reference vehicle heights $D_{RLO}$ and $D_{RRO}$ for both the right and left wheels are changed in accordance with the formulae below, and oil intake and discharge are performed to and from the suspensions 1c and 1d of the left and right rear wheels so that the strokes thereof become approximately corrected reference vehicle heights $D'_{RLO}$ and $D'_{RRO}$.

$$D'_{RLO}=D_{RLO}-\tfrac{1}{2}\{(D'_{FL}-D'_{FR})-(D'_{RL}-D'_{RR})\}. \quad \ldots (1)$$

$$D'_{RRO}=D_{RRO}+\tfrac{1}{2}\{(D'_{FL}-D'_{FR})-(D'_{RL}-D'_{RR})\}. \quad \ldots (2)$$

In formulae (1) and (2) above, the terms $(D'_{FL}-D'_{FR})$ and $(D'_{RL}-D'_{RR})$ respectively represent the inclination in the left and right directions of the front wheels and the inclination in the left and right directions of the rear wheels (with upward inclination toward the left wheels being positive), and the term enclosed by the bracket $\{\}$ represents the difference between the amounts of inclination in the left and right directions of the front and rear wheels, that is to say, the amount of distortion of the road surface.

Figure 4:
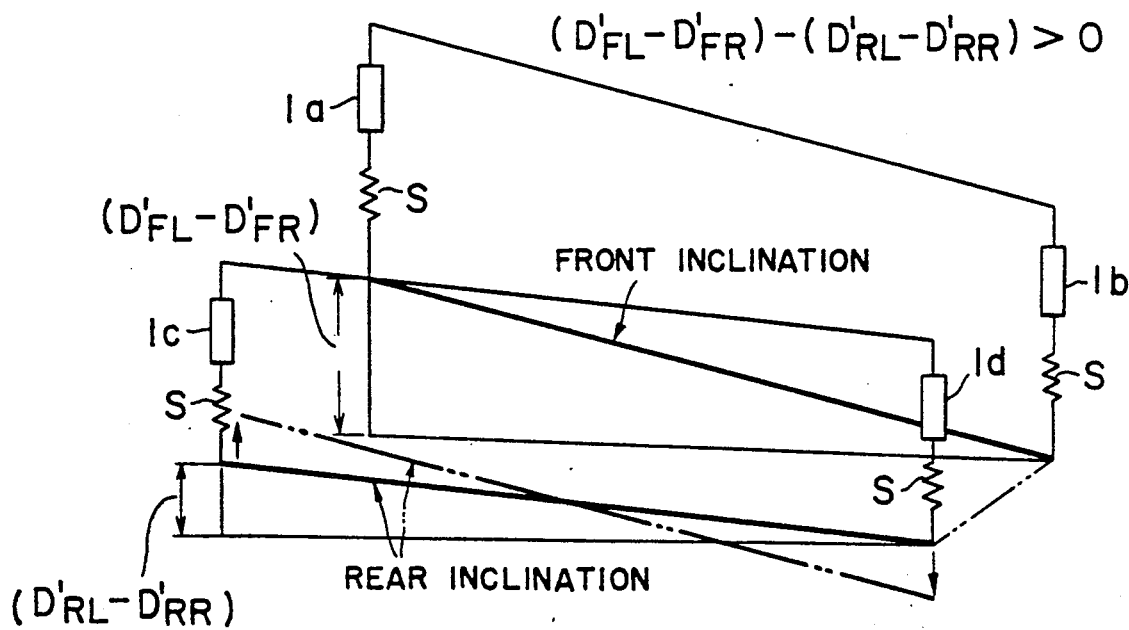
FIGS. 4 and 5 are diagrams for explaining the principle of vehicle height control according to the present invention.

In the case of the distorted road surface shown in FIG. 3, the control is carried out as follows. Since the control for the front wheel suspensions 1a and 1b is a simple control to attain the reference vehicle heights $D_{FLO}$ and $D_{FRO}$, the suspensions 1a and 1b incline the front part of the vehicle to be lower at the right side so that the vehicle front part assumes an attitude parallel to a line linking the tire contact points of the left and right front wheels, when the term enclosed by the bracket $\{\}$ is positive value as shown in FIG. 4, for example, the suspension 1c of the left rear wheel is controlled so that it approaches the corrected reference vehicle height $D'_{RLO}$ which is smaller than the original reference vehicle height $D_{RLO}$. Also, the suspension 1d of the right rear wheel is controlled so that it approaches the corrected reference vehicle height $D'_{RRO}$ which is larger than the original reference vehicle height $D_{RRO}$. As a result, the rear part of the vehicle is also inclined as indicated by chain line so that the rear part is in accordance with the status of inclination of the front part, that is, the status of the road surface at the front end of the vehicle.

Figure 5:
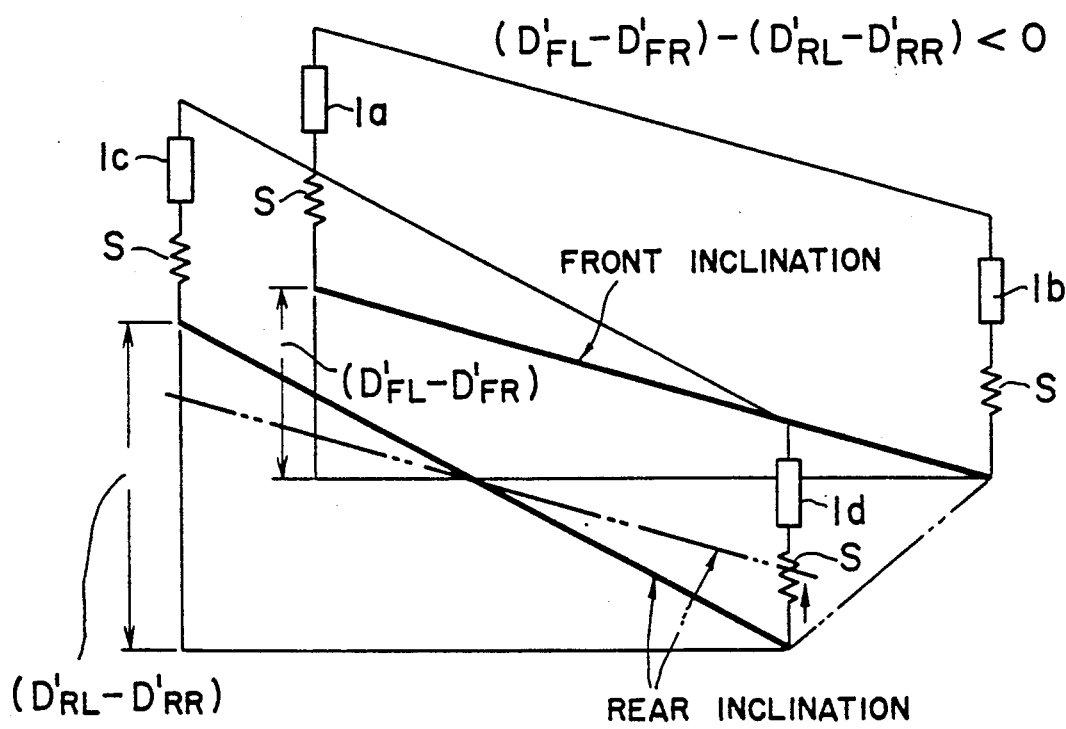

When the term enclosed by the bracket $\{\}$ is a negative value as shown in FIG. 5, the suspension 1c of the left rear wheel is controlled so that it approaches the corrected reference vehicle height $D'_{RLO}$ which is larger than the original reference vehicle height $D_{RLO}$. Also, the suspension 1d of the right rear wheel is controlled so that it approaches the corrected reference vehicle height $D'_{RRO}$ which is smaller than the original reference vehicle height $D_{RRO}$. As a result, the rear part of the vehicle is also inclined as indicated by chain line so that the rear part is in accordance with the status of inclination of the front part, that is, the status of the road surface at the front end of the vehicle.

Figure 6:
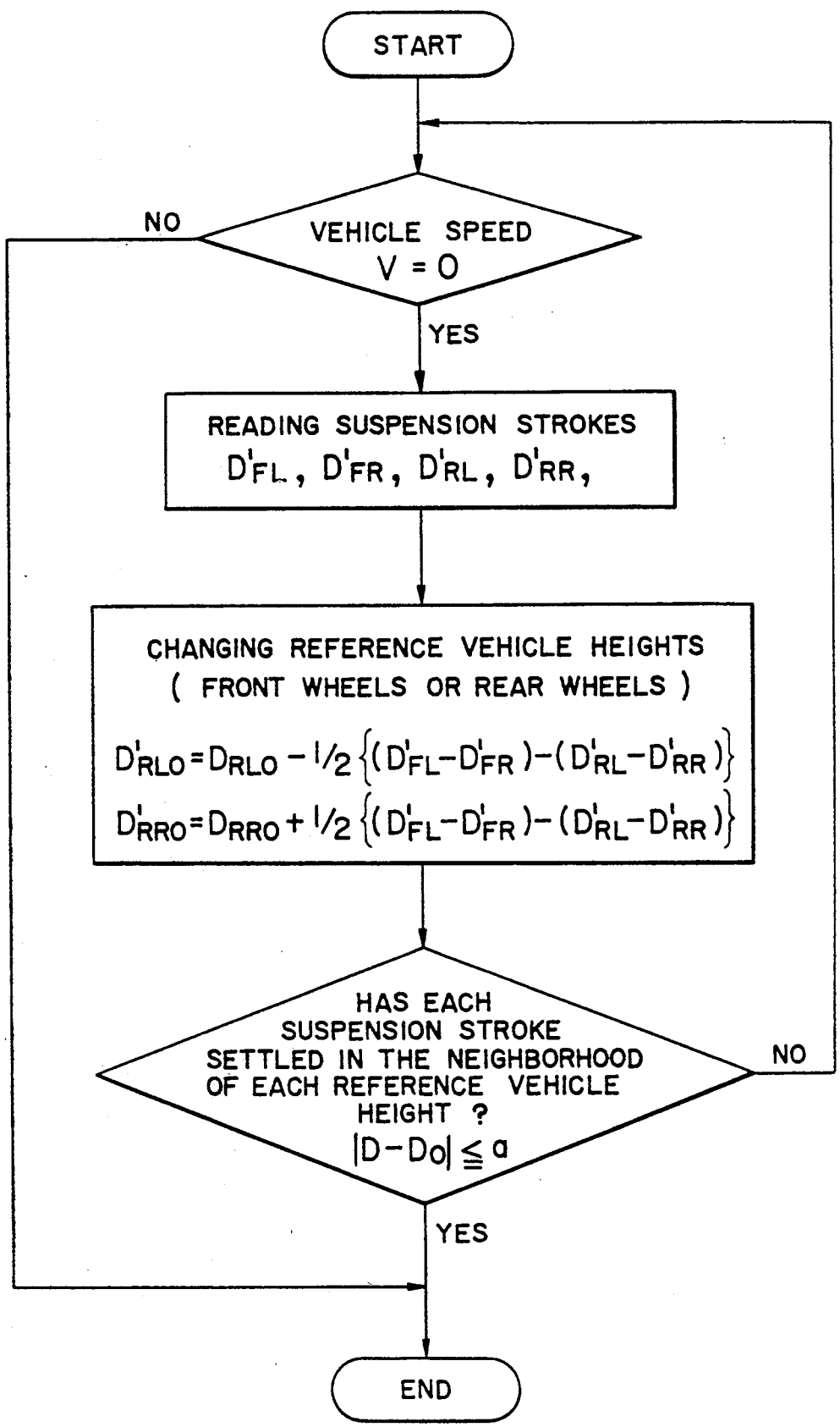
FIG. 6 is a flow chart of the vehicle height control according to the present invention.

In the control operations described above, when the suspensions 1a, 1b, 1c and 1d of the four wheels do not become within the range of insensitive band (reference vehicle height ± several millimeters), the suspension strokes are read once again, the reference vehicle heights are corrected in the same manner and vehicle height adjusting control is performed once again, a series of operations being repeated until the suspensions of the four wheels fall into the insensitive band at the same time. The period for the reading of the suspension strokes is within the time required for the minimum normal vehicle height adjustment. The operation described above is as shown in the flow chart of FIG. 6.

In the course of the control that has been described above, when the vehicle is stationary on a road where there is no road surface distortion or where the amount of road surface distortion is such that the discrepancy between the suspension stroke difference of the front wheels and the suspension stroke difference of the rear wheels is within the insensitive band, $D'_{RLO} \approx D_{RLO}$, $D'_{RRO} \approx D_{RRO}$ holds and the control is approximately the same as the normal vehicle height control.

The above description relates to an embodiment in which the normal vehicle height control is performed for the suspensions of the front wheels and the reference vehicle height for the suspensions of the rear wheels are changed in accordance with formulae (1) and (2). But it is also possible to have the normal vehicle height control performed for the suspensions of the left and right rear wheels and to change the reference vehicle height for the suspensions of the left and right front wheels.

When this is performed, the formulae used for changing the reference vehicle height $D_{FLO}$ and $D_{FRO}$ for the left and right front wheels are (3) and (4) below.

$$D'_{FLO}=D_{RLO}+\tfrac{1}{2}\{(D'_{FL}-D'_{FR})-(D'_{RL}-D'_{RR})\}. \quad \ldots (3)$$

$$D'_{FRO}=D_{RRO}-\tfrac{1}{2}\{(D'_{FL}-D'_{FR})-(D'_{RL}-D'_{RR})\}. \quad \ldots (4)$$

Figure 7:
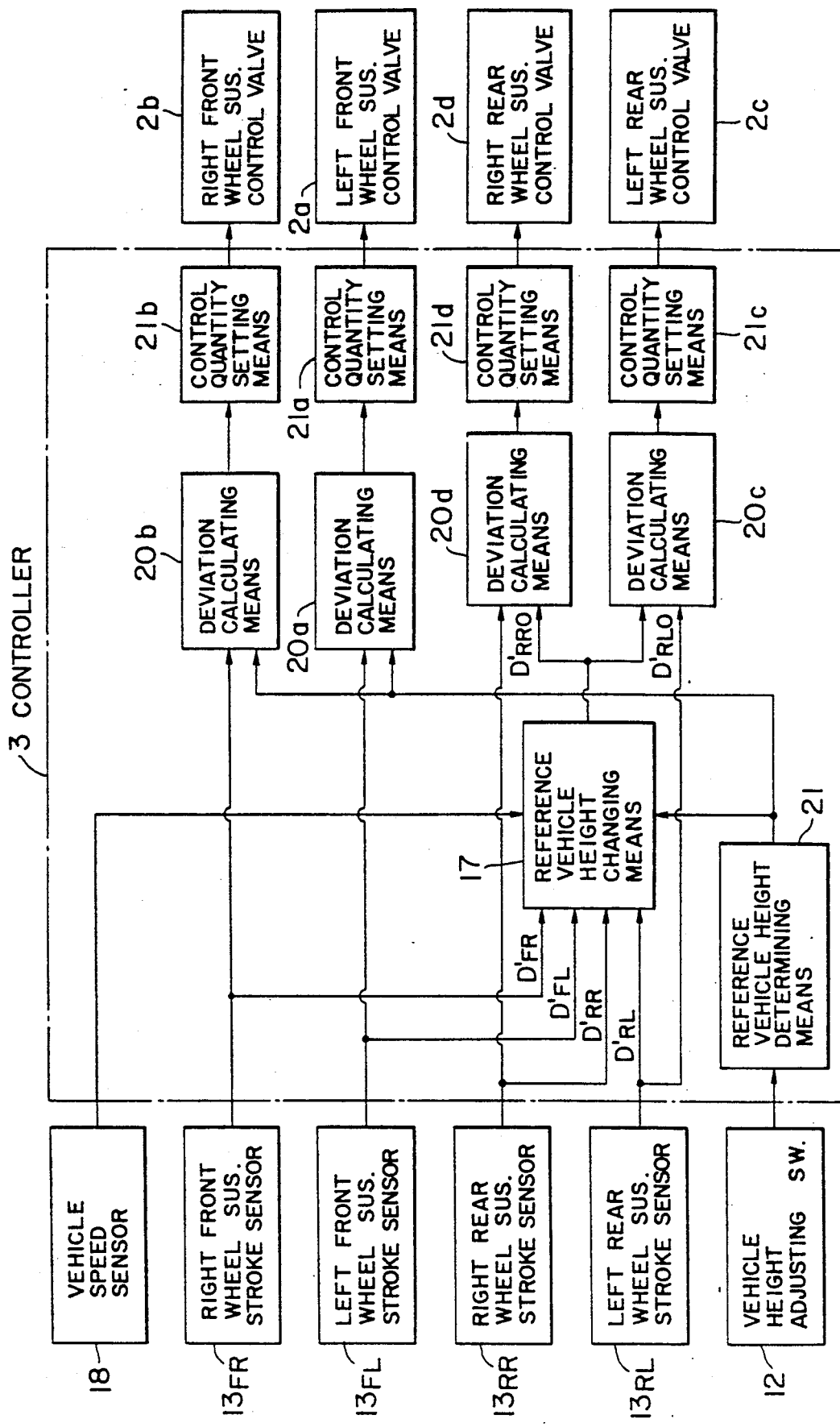
FIG. 7 is a block diagram showing a controller for controlling vehicle height used in the present invention.

FIG. 7 shows a block diagram of an apparatus for controlling the vehicle height. The controller 3 has a reference vehicle height changing means 17 to which signals from the four suspension stroke sensors 13 are input. The right front wheel suspension stroke sensor, the left front wheel suspension stroke sensor, the right rear wheel suspension stroke sensor and the left rear wheel suspension stroke sensor are designated by $13_{FR}$, $13_{FL}$, $13_{RR}$ and $13_{RL}$, respectively, in this figure. Further, there is provided a vehicle speed sensor 18 which delivers vehicle speed signals to the reference vehicle height changing means 17.

Signals are delivered from the four suspension stroke sensors $13_{FR}$, $13_{FL}$, $13_{RR}$ and $13_{RL}$ also to deviation calculating means $20b$, $20a$, $20d$ and $20c$, respectively. The controller 3 further has a reference vehicle height determining means 21 to which a signal is input from the vehicle height adjusting switch 12. Output signals of the reference vehicle height determining means 21 are supplied to the reference vehicle height changing means 17 as well as to the deviation calculating means $20a$ and $20b$. The reference vehicle height changing means 17 puts out a signal to the deviation calculating means $20c$ and $20d$.

The four deviation calculating means $20a$, $20b$, $20c$ and $20d$ output signals to the left front wheel suspension control valve $2a$, the right front wheel suspension control valve $2b$, the left rear wheel suspension control valve $2c$ and the right rear wheel suspension control valve $2d$ through control quantity setting means $21a$, $21b$, $21c$ and $21d$, respectively.

In operation, the vehicle height adjusting switch 12 is operated to selectively set a reference vehicle height at the reference vehicle height determining means 21, which outputs the selected reference vehicle height signal to the reference vehicle height changing means 17. When the vehicle speed sensor 18 delivers a zero speed signal to the refernce vehicle height changing means 17, the reference vehicle height changing means 17 operates to change the reference vehicle height which is input from the reference vehicle height determining means 21, according to the formulae (1) and (2) set forth hereinbefore. Signals of the changed reference vehicle heights $D'_{RLO}$ and $D'_{RRO}$ are delivered to the deviation calculating means $20c$ and $20d$ where the deviations of the actual suspension strokes for the left and right rear wheels from the changed reference vehicle heights $D'_{RLO}$ and $D'_{RRO}$ are calculated. According to the deviations thus calculated at the calculating means $20c$ and $20d$, signals are supplied from the calculating means $20c$ and $20d$ to the control quantity setting means $21c$ and $21d$, respectively, whereby the control valves $2c$ and $2d$ are operated according to the control quantities corresponding to the deviations, respectively.

In the deviation calculating means $20a$ and $20b$, suspension strokes of the left and right front wheels are compared with the reference vehicle height to calculate deviations from the reference vehicle height. The output deviation signals from the calculating means $20a$ and $20b$ operate the control valves $2a$ and $2b$ through the control quantity setting means $21a$ and $21b$, respectively, whereby normal control is carried out for the suspensions of the front wheels to attain the original reference vehicle height.

It will be understood that although in the embodiment of FIG. 7 the front wheel suspensions are subjected to normal control and the rear wheel suspensions are subjected to control on the basis of the changed reference vehicle heights, the front wheel suspensions may be subjected to the control on the basis of the changed reference vehicle heights while the rear wheel suspensions may be subjected to the normal control.

The present invention is not limited to the application to the suspension system illustrated in FIGS. 1 and 2, but may also be applied to suspension systems of an arbitrary organization that perform vehicle height adjustment by detecting the suspension stroke of the suspension for each of the four wheels and perform such an independent control for each of the suspensions that the reference vehicle height is maintained on the basis of information for each of the suspension strokes.

According to the present invention as has been described above, when a vehicle having a vehicle height adjusting function is stationary on a distorted road surface, it is possible to adjust the length of each suspension within a relatively short time in such a manner that the state of contact of each of the tires with the distorted road surface is brought into a state of good balance. As a result, it is made possible to prevent the conventional undesirable situations where the contact load balance of the tires is poor and where the vehicle height adjustment does not end because one of the tires enters a state of non-contact with the road surface.

While the presently prefered embodiment of the present invention has been shown and described, it is to be understood that the disclosure is for the purpose of illustration and that various changes and modifications may be made without departing from the scope of the invention as set forth in the appended claims.

What is claimed is:

1. A method of controlling height of a vehicle having vehicle height adjusting means wherein strokes of suspensions of front and rear wheels are detected and the height of the vehicle is controlled responsive to the detected strokes so as to attain a reference vehicle height independently for each of the suspensions, said method comprising the steps of:

detecting the strokes of the suspensions for the front wheels and the rear wheels when the vehicle speed becomes zero;

controlling the vehicle height adjusting means with respect to one of the front wheel suspension pair and the rear wheel suspension pair to attain the reference vehicle height for both the left and right wheels of the one pair so that the vehicle assumes an attitude matching a transverse inclination of a road surface at an end part of the vehicle having said one pair of the suspensions; and controlling the vehicle height adjusting means with respect to the other pair of the suspensions to change the reference vehicle height responsive to the detected strokes such that an end part of the vehicle having said other pair of the suspensions assumes an attitude, with respect to a direction transverse to the vehicle, equal to said attitude of the end part of the vehicle having said one pair.

2. The method according to claim 1, wherein the vehicle height adjusting means is controlled with respect to the pair of the rear wheel suspensions such that the reference vehicle heights are changed according to the formulae $$D'_{RLO} = D_{RLO} - \tfrac{1}{2}\{(D'_{FL} - D'_{FR}) - (D'_{RL} - D'_{RR})\}$$

$$D'_{RRO} = D_{RRO} + \tfrac{1}{2}\{(D'_{FL} - D'_{FR}) - (D'_{RL} - D'_{RR})\}$$

where $D'_{RLO}$ and $D'_{RRO}$ are changed reference vehicle heights; $D_{RLO}$ and $D_{RRO}$, the reference vehicle height for the left and right rear wheels, respectively; $D'_{FL}$ and $D'_{FR}$, the detected strokes of the suspensions for the left and right front wheels, respectively; and $D'_{RL}$ and $D'_{RR}$, the detected strokes of the suspensions for the left and right rear wheels, respectively.

3. The method according to claim 1, wherein the vehicle height adjusting means is controlled with respect to the pair of the front wheel suspensions such that the reference vehicle heights are changed according to the formulae $$D'_{FLO} = D_{FLO} + \tfrac{1}{2}\{(D'_{FL} - D'_{FR}) - (D'_{RL} - D'_{RR})\}$$

$$D'_{FRO} = D_{FRO} - \tfrac{1}{2}\{(D'_{FL} - D'_{FR}) - (D'_{RL} - D'_{RR})\}$$

where $D'_{FLO}$ and $D'_{FRO}$ are changed reference vehicle heights; $D_{FLO}$ and $D_{FRO}$, the reference vehicle height for the left and right front wheels, respectively; $D'_{FL}$ and $D'_{FR}$, the detected strokes of the suspensions for the left and right front wheels, respectively; and $D'_{RL}$ and $D'_{RR}$, the detected strokes of the suspensions for the left and right rear wheels, respectively.

4. An apparatus for controlling height of a vehicle, having vehicle height adjusting means for each of front and rear wheels, detection means for detecting strokes of suspensions of the wheels, respectively, and setting means for setting a reference vehicle height, said apparatus comprising:
   first controlling means for controlling the vehicle height adjusting means with respect to one of the front wheel suspension pair and the rear wheel suspension pair to attain the reference vehicle height for the left and right wheels of the one pair so as to maintain one end part of the vehicle having said one pair of the suspensions parallel to a line connecting both contact points of a road surface with the left and right wheels of the one pair;
   sensing means for sensing a stationary condition of the vehicle;
   changing means responsive to the stationary condition for changing the reference vehicle heights for the left and right wheels of the other suspension pair, respectively, in accordance with the strokes detected by the detection means;
   second controlling means for controlling the vehicle height adjusting means with respect to the other suspension pair to converge the strokes of the other suspension pair to changed to reference vehicle heights, respectively, so as to maintain the balance between the contact loads of the wheels regardless of the distortion of the road surface.

5. The apparatus according to claim 4, wherein said sensing means is a vehicle speed sensor for supplying a signal representing the stationary condition when vehicle speed is zero.

6. The apparatus according to claim 4, wherein said other pair consists of the rear wheel suspensions and said changing means includes means for carrying out a calculation in accordance with the formulae $$D'_{RLO} = D_{RLO} - \tfrac{1}{2}\{(D'_{FL} - D'_{RL} - D'_{RR})\}$$

$$D'_{RRO} = D_{RRO} - \tfrac{1}{2}\{(D'_{FL} - D'_{RL} - D'_{RR})\}$$

where $D'_{RLO}$ and $D'_{RRO}$ are the changed reference vehicle heights; $D_{RLO}$ and $D_{RRO}$, the reference vehicle heights for the left and right rear wheels, respectively; $D'_{FL}$ and $D'_{FR}$, the detected strokes of the suspensions for the left and right front wheels, respectively; and $D'_{RL}$ and $D'_{RR}$, the detected strokes of the suspensions for the left and right rear wheels, respectively.

7. The apparatus according to claim 4, wherein said other pair consists of the front wheel suspensions and said changing means includes means for carrying out a calculation in accordance with the formulae $$D'_{FLO} = D_{FLO} + \tfrac{1}{2}\{(D'_{FL} - D'_{FR}) - (D'_{RL} - D'_{RR})\}$$

$$D'_{FRO} = D_{FRO} - \tfrac{1}{2}\{(D'_{FL} - D'_{FR}) - (D'_{RL} - D'_{RR})\}$$

where $D'_{FLO}$ and $D'_{FRO}$ are the changed reference vehicle heights; $D_{FLO}$ and $D_{FRO}$, the reference vehicle heights for the left and right front wheels, respectively; $D'_{FL}$ and $D'_{FR}$, the detected strokes of the suspensions for the left and right front wheels, respectively; and $D'_{RL}$ and $D'_{RR}$, the detected strokes of the suspensions for the left and right rear wheels, respectively.

* * * * *